April 5, 1927.
R. SHOCH
FLOWER HOLDER
Filed Sept. 3, 1925
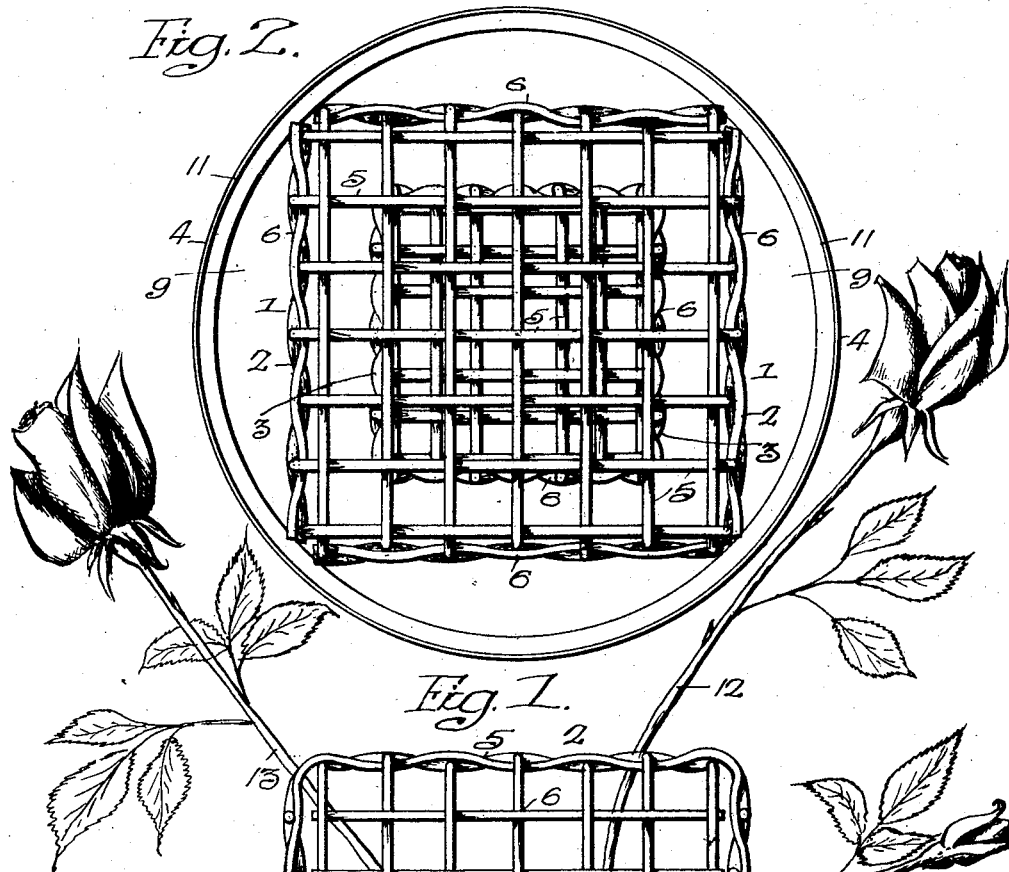
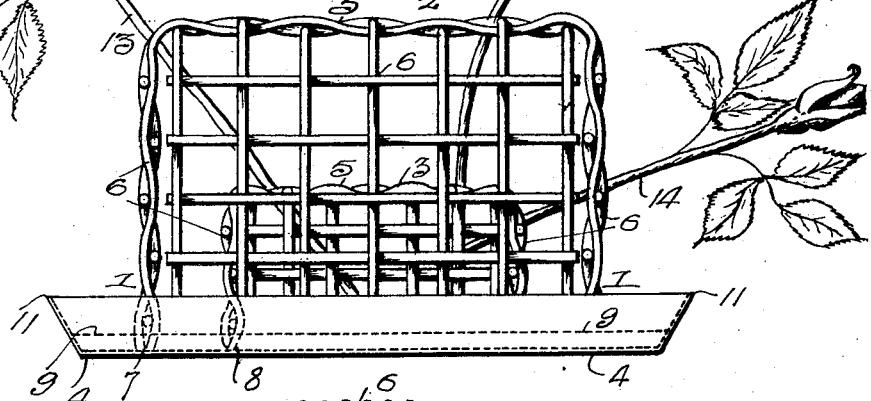
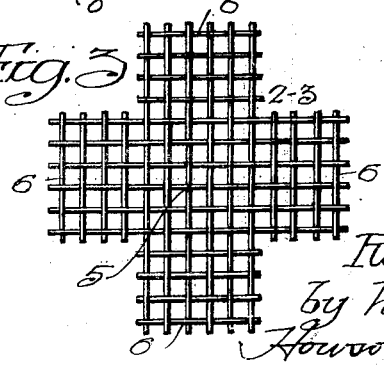
Inventor—
Robert Shoch,
by his Attorneys,
Howson & Howson Patented Apr. 5, 1927.

1,623,856

UNITED STATES PATENT OFFICE.

ROBERT SHOCH, OF PHILADELPHIA, PENNSYLVANIA, ASSIGNOR TO M. RICE COMPANY, OF PHILADELPHIA, PENNSYLVANIA, A CORPORATION OF PENNSYLVANIA.

FLOWER HOLDER.

Application filed September 3, 1925. Serial No. 54,317.

My invention relates to flower supports, and it has for one object the provision of a support, whereby flower stems may be supported at two points.

Another object of my invention is to provide a flower support, wherein the flowers may be supported over a large angular range.

A further object of my invention is to provide a flower support comprising a pair of spaced cages and a supporting member, the walls of the inner cage being raised above said base member sufficient to afford a desired leverage on a flower stem.

A still further object of my invention is to provide a weighted base for a pair of nested cages, whereby heavy flowers may be supported therein and the drainage therefrom retained on said base.

Other objects and applications of my invention, as well as details of construction and arrangement, whereby my invention may be practiced, will appear more fully hereinafter, when taken in connection with the accompanying drawings, wherein—

Figs. 1 and 2 are side and top-plan views, respectively, of a flower support embodying my invention; and Fig. 3 is a view of one of the reticulated members from which the cage is formed.

In the embodiment of my invention shown in the drawings, a flower holder 1 comprises broadly a pair of nested cages 2 and 3 and a supporting tray 4.

As shown particularly in Fig. 3, each cage comprises a central portion 5 adapted to constitute the upper wall of the cage and four outwardly extending arms 6 adapted to constitute the side walls of the cage. The edges 7 and 8 of the inner and outer cage side walls may be rigidly secured to the tray 4 by being imbedded in a fusible material 9 carried by said tray. The tray or base member 4 may be provided with an upwardly extending peripheral flange 11, whereby water or other fluid draining from the flowers may be prevented from spreading to surrounding objects. The fusible material 9 also serves to weight the tray 4, so that very heavy flowers may be supported without the danger of the flower holder 1 tilting over. The tray 4 may also be weighted by constructing the same of a very heavy material.

In Fig. 1 is shown a flower stem 12 passing through the horizontal walls of the outer and inner cages 2 and 3. A second flower stem 13 is shown passing through the cages 2 and 3 in an inclined position and a third flower stem 14 is shown passing therethrough in a horizontal position. As will be apparent, the raised inside screen or cage 3 and the outer cage 2 afford a maximum purchase to the flower stems. Moreover, the flowers may be disposed over a maximum angular range.

While I have shown only one embodiment of my invention, it is apparent that various changes and modifications may be made therein without departing from the spirit and scope of the invention.

I claim:

1. Apparatus comprising a plurality of nested cages having corresponding open sides, and a supporting member for closing said open sides.

2. A pair of cages, and a supporting member therefor, formed to serve as a tray, said cages having certain portions thereof imbedded in said supporting member.

3. Apparatus comprising a base member, and a pair of cages supported thereon, said cages having substantially parallel walls.

4. A flower holder comprising a plurality of nested cages having horizontal and vertical walls, one of said cages comprising a central section adapted to form a horizontal wall and a plurality of outwardly extending arms adapted to constitute vertical walls, and a tray for supporting said cages.

ROBERT SHOCH.